United States Patent [19]
Delatorre

[11] Patent Number: 5,230,250
[45] Date of Patent: Jul. 27, 1993

[54] CAPACITOR AND PRESSURE TRANSDUCER

[76] Inventor: Leroy C. Delatorre, 2219 Country Club, Sugar Land, Tex. 77478

[21] Appl. No.: 753,868

[22] Filed: Sep. 3, 1991

[51] Int. Cl.$^5$ .......................... G01L 7/04; G01L 9/12
[52] U.S. Cl. ...................................... 73/733; 73/155; 73/743; 73/862.625; 361/283
[58] Field of Search ................. 73/718, 724, 733, 151, 73/151.5, 152, 154, 155, 862.33, 862.48, 742, 743; 361/283

[56] References Cited

U.S. PATENT DOCUMENTS

| | | | |
|---|---|---|---|
| 2,563,899 | 8/1951 | Wiancko | 73/742 |
| 4,434,451 | 2/1984 | Delatorre | 361/283 |
| 4,873,870 | 10/1989 | Delatorre | 73/724 |

*Primary Examiner*—Donald O. Woodiel

[57] ABSTRACT

A dual capacitor device for utilizing dependent capacitances for measurement purposes where an upper capacitor base member and a lower capacitance base member are arranged with parallel capacitor surfaces in horizontal planes and where the parallel capacitor surfaces are located on opposite sides relative to a vertical axis to define first and second capacitors. The lower capacitor base member has a centrally located section connected to an outer section of the lower capacitor base member by a torsion beam and the centrally located section is attached to the upper capacitor base member by a vertical arm member. The torsion beam means has a displacement axis normal to the central axis so that angular displacement of the torsion beam and the centrally located section about the displacement axis produces a capacitance change in the first and second capacitors. A force moment applied to the centrally located section by a spirally wound bourdon tube in response to pressure develops a low force on the torsion beam which is less than the micro yield point of the torsion beam material and develops a micro dimensional angular displacement of the centrally located section and a capacitance change as a function of the force to measure high pressures with small deflections of the capacitor. The structure is arranged to compensate for changing temperature.

12 Claims, 5 Drawing Sheets

CAPACITOR AND PRESSURE TRANSDUCER

RELATED APPLICATION

This application has subject matter related to Ser. No. 730,694, filed Jul. 16, 1991 and entitled: "Capacitor and Pressure Transducer".

FIELD OF THE INVENTION

This invention relates to capacitors and pressure transducers and more particularly to relatively small capacitors utilizing microdisplacements for use in high pressure transducers requiring a wide pressure range of operations under changing temperature conditions and for producing pressure measurements with a high degree of accuracy.

BACKGROUND OF THE INVENTION

While the present invention finds particular usefulness in the oil industry, it has particular application in other hostile pressure and temperature environments where size and accuracy are important. In an oil well pressure transducer, it is common to size a unit to go into a small diameter metal pressure housing for measurement of pressures up to 20,000 psi and even more and which can be exposed to downhole temperatures up to 400° F. or more. The pressure housing must have a wall thickness sufficient to withstand the downhole pressures so that the O.D. of the internal pressure transducer is in the neighborhood of one inch.

A downhole oil well pressure gauge can be transported by a wireline, cable or pipe string to one or more levels of interest in a well bore where both temperature and pressure are sensed over a period of time. Typically, pressure measurements are repeatedly sampled and recorded over a period of time at a sampling rate determined by down hole electronics and may be stored in a downhole memory for subsequent replay or sent to the surface for analysis. Alternately, sometimes gauges are attached to production strings or other downhole equipment for extended periods of time or "permanently". In both uses of the gauge, sudden downhole pressure changes can also typically accompanied by a temperature change in a relatively short period of time. It is also important for the accuracy of the pressure sensor to not change its calibration over a period of time in the borehole in response to pressure or temperature effects in the boreholes. Thus, there is a need for a pressure gauge for high pressure measurements which is also insensitive to sudden changes in temperature or effects of pressure. The present invention relates to high pressure transducers which can accurately measure high pressure changes under transient temperature conditions. The invention is also applicable to low pressure designs.

Under the combined effect of high temperature and pressure conditions, the typical pressure sensor structure is subjected to high stress by the applied high pressure and subjected to high temperature both of which cause creep in the materials. Creep in materials tends to be exponentially related to both temperature and stress levels. The effect of creep or permanent deformation is to alter the calibration or measurement characteristics of a sensor and cause the sensor to obtain inaccurate measurements from its calibration standard over a period of time.

Heretofore, capacitance type transducers have been utilized for pressure measurements where a downhole oil well pressure varies an electrical capacitance as a function of pressure. The pressure is translated to a capacitance measurement by a pressure diaphragm moving parallel arranged capacitance plates toward and away from one another. An example of this kind of device is shown in U.S. Pat. No. 4,322,775.

I have also coupled a bourdon tube to a capacitance type of sensor as disclosed in U.S. Pat. No. 4,873,870 in which sensor system, the pressure in the bourdon tube generates a directional linear force to displace quartz supported parallel arranged capacitor elements toward and away from one another. While this device is satisfactory for a number of applications, it is a difficult unit to manufacture.

In the present invention, I have developed a capacitor device which has a unique relationship of capacitors and can be constructed from metals to respond to low force inputs and be relatively insensitive to temperature changes. The capacitor device is particularly adaptable to high pressure measurements with a high degree of accuracy.

SUMMARY OF THE INVENTION

In the present invention, dual capacitors are defined by spaced apart horizontal capacitor plates respectively located on capacitor base members. The capacitor plates for each capacitor are disposed at equally offset locations relative to a central vertical axis for the device. One of the capacitor base members can be angularly displaced about a horizontal displacement axis by an applied torque force to dependently vary the respective capacitance of the capacitors. The angular displacement is obtained by a spirally wound bourdon tube which, when subjected to internal fluid pressure, produces a force on a moment arm attached to the angularly displaceable capacitor base member.

The bourdon tube is attached between the moment arm and a reference base member to provide the moment force to the moment arm. Although the bourdon tube can be subjected to high pressures, the stress levels in the metal bourdon tube can be designed to be well within its elastic limits because only a low force is required and the angular displacement of the capacitor base member is in micro measurements. Thus, creep and permanent distortion in the material which is caused by stress are minimized in the system. Further, the effect of bourdon tube creep is reduced by the constraining effect of the torque beam to be described more fully hereafter.

By arranging a capacitor base member so that related capacitances between capacitor plates are varied as a function of an angular relationship of the capacitor plates relative to a mid-plane, a high capacitance sensitivity can be obtained with low angular deflection. That is, a micro dimensional change in the capacitor gap produces a defined measurement parameter. The high sensitivity is obtained by measurement of a small displacement of the capacitor plates at a significant distance from the center of angular displacement (the displacement axis). The elastic characteristics of a metal torque beam means coupled to the force end of the spirally wound bourdon tube by a moment arm become the primary determining element relative to elastic properties.

The reason that the beam means is a primary determining element is that the deflection of the bourdon tube is restrained by the beam means to be a small fraction of the unrestrained deflection of the bourdon tube. Thus, the deflection of the bourdon tube is controlled by the elastic characteristics of the beam means and the bourdon tube becomes essentially a pressure to force converter. By using a low driving torque force of a bourdon tube (even for high pressure) and a minute angular deflection of the beam means, the stress levels in the bourdon tube and particularly in the torque beam means can be kept well within micro-elastic limits. High performance metal alloys can then be used to provide correspondingly higher micro yield values so that near perfect elastic characteristics are attainable in the operating range of the transducer.

Temperature is an important factor because it can affect the calibration of the sensor. While a pressure measuring device at an ambient temperature can be generally corrected by measured temperature, a change of temperature from an ambient value can thermally affect the response of the pressure measuring device to pressure which affects the accuracy of the pressure measurement. Changes in temperature often occur with changes in pressure so it is important to accurate pressure measurement for the pressure measuring device to be insensitive to changing or varying temperatures or to compensate for the changing temperatures.

In the present invention, an upper capacitor base member is connected by a vertical moment arm to a support located centrally within a lower capacitor base member. The support is connected by a single rectangularly shaped torque beam to an outer portion of the lower base member and is connected to a bourdon tube at a diametrically opposed location. The bourdon tube is located to one side of the lower capacitor base member. The torque beam has a rectangular cross section and the end of the bourdon tube are aligned with a horizontal displacement axis which extends through the length of the torque beam. Pressure in the bourdon tube produces a low force to torque the torque beam and dependently vary the capacitors.

The non-symmetrical cross section of the torque beam allows for large rigidity in the direction of the long cross sectional dimension without greatly increasing the torsional rigidity. When the long cross sectional dimension is aligned perpendicular to the capacitance plates, the long cross section reduces the effect of temperature expansion of the bourdon tube on the displacement of the capacitor plates. Any linear deflection of the torque beam in the direction of the short rectangular cross section dimension does not result in any significant capacitance response since the gap length of the capacitor plates does not change. Therefore, horizontal linear deflections of the bourdon tube are rejected. The capacitor structure is arranged with tortious paths for isolation of the capacitors from the effects of temperature changes.

The effect of temperature on the modulus of elasticity of the torque beams due to material selection can be largely eliminated by use of a compensation spacer to adjust the capacitance gap in response to temperature changes as taught in the technology disclosed in U.S. Pat. No. 4,322,775.

DESCRIPTION OF THE PRESENT INVENTION

Figure 1:
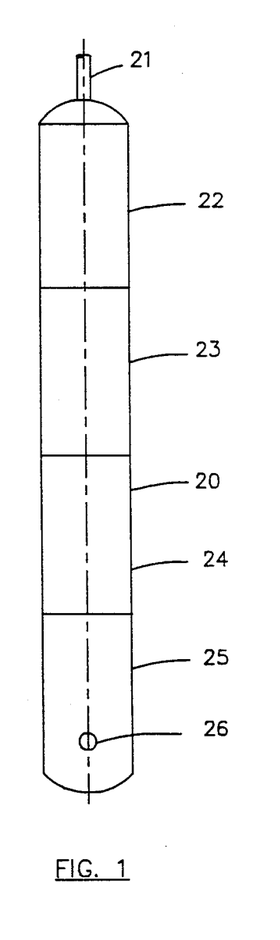
FIG. 1 is a typical arrangement for an oil well pressure measuring device as found in current use.

By way of background, as shown in FIG. 1, a downhole cylindrically shaped well tool 20 is sized for insertion through a small diameter well tubing and adapted for coupling to the end of a wireline cable 21. The cable 21 extends to a surface located spooling reel or drum (not shown). The tool 20 generally includes a DC battery pack section 22, as a source of electrical power, an electronic section 23 with electrical circuitry for electrically processing and for providing electrical power, a temperature sensor section 24 with a temperature probe for sensing temperature and a pressure sensor section 25 with a pressure transducer for sensing pressure. An opening 26 admits fluid under pressure to the pressure sensor or the transducer in the sensor section 25. For further reference purposes, see U.S. Pat. No. 4,763,259.

In permanent gauge installations the temperature and sensor sections are incorporated with downhole equipment for permanent position or location in a well bore.

Figure 2:
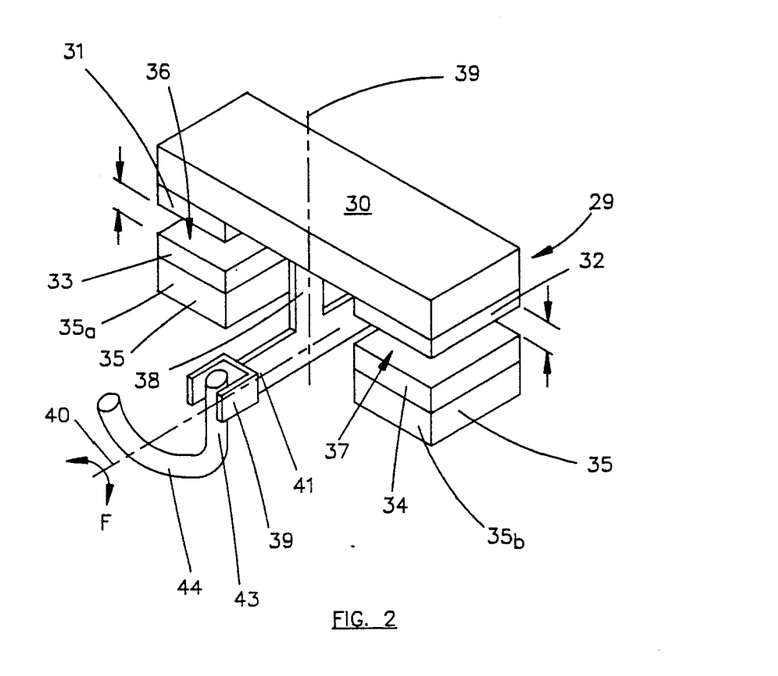
FIG. 2 is a schematic view in perspective of the invention to illustrate the concept of measuring system of the present invention.

Referring now to FIG. 2, the operating concept of the apparatus of the present invention is schematically (not structurally or proportionally) illustrated for descriptive purposes. A capacitance transducer 29 has an upper base member 30 with electrical capacitance plates 31,32 which are spacially disposed in a parallel relationship relative to opposing electrical capacitance plates 33,34 on spaced apart portions 35a,35b on a lower capacitor base member 35 (partially shown) to define capacitance gaps 36,37. While the capacitance plates 33,34 are illustrated separately from the base member 35, the plates can be the metal base member itself in an electrically grounded capacitance arrangement.

The upper base member 30 is attached at a center point to a transverse vertical support or moment arm 38 (shown as a beam for explanation purposes) which extends longitudinally along a vertical axis 39. A horizontal torque or displacement axis 40 is located in a median horizontal plane extending through the lower base member 35 and intersects the longitudinal axis 39. The axis 40 extends through a transverse torsion beam member 41.

The torsion beam member 41 is located between the base member portions 35a,35b and is attached to the vertical moment arm 38. The torsion beam member 41 is rectangular in cross section and also connects to the base member portions 35a,35b. In FIG. 2, the vertical axis 39 lies in a vertical plane which bisects the beam member 41. The displacement axis 40 is centrally located in the cross section of the beam member, lies in the vertical plane and intersects the vertical axis 39 in a transverse direction. Thus, the beam member 41 extends along the displacement axis 40 and is arranged to be torqued about the displacement axis 40.

As shown in FIG. 2, the end of the beam member 41 is connected by a clevis 42 to the closed end 43 of a spirally wound bourdon tube 44. The clevis 42 is attached to the vertical stub or closed end 43 of the spirally wound bourdon tube 44. The bourdon tube 44 is disposed in a vertical plane normal to the displacement axis 40 and develops a moment force about the axis 40.

It can be appreciated that the rotative displacement of the plates 31 and 32 about the axis 40 relative to the corresponding plates 33 and 34 can decrease the spacing of one gap 36 while increasing the spacing of the other gap 37. Thus, separate capacitors respectively utilizing the capacitance plates 31,33 and 32,34 will have dependently related capacitance changes in response to rotative displacement. As will be discussed herein, the displacement is in microdimensions which can be obtained with low forces which in turn reduces the stresses in the torsion beam.

The bourdon tube 44 has a flattened cross section between the stub end 43 and on the entrance end of the tube. In response to internal pressure, the bourdon tube 44 produces a torque force or force moment (see arrow F about force axis) which acts to torque the torsion beam 41 about the displacement axis 40. The force moment will angularly displace the vertical moment arm member 38 and move the upper base member 30 about the displacement axis 40 to change the relative spacing of the capacitance gaps 36,37 and change the capacitance of the two capacitors as a function of the pressure in the bourdon tube 44. The vertical axis of the stub end 43 of the bourdon tube is aligned with the vertical axis 39.

From the foregoing basic illustration of the concept of the present invention, it can be appreciated that a bourdon tube is utilized to develop a low force in response to high pressure which torques a beam member about a displacement axis and produces a micro dimensional deflection of dependent capacitors. By maintaining the deflection within the microelastic characteristics of the material for the beam member and utilizing low measurement forces, the stress level in the beam member can be kept low which permits high accuracy measurements. The high accuracy measurements are obtainable because permanent distortion of the displacement material usually associated with materials under stress does not appreciably occur. Material criterion for the torsion beam is that the material should have a micro yield point which is above the stress level produced by a torque force.

Figure 3:
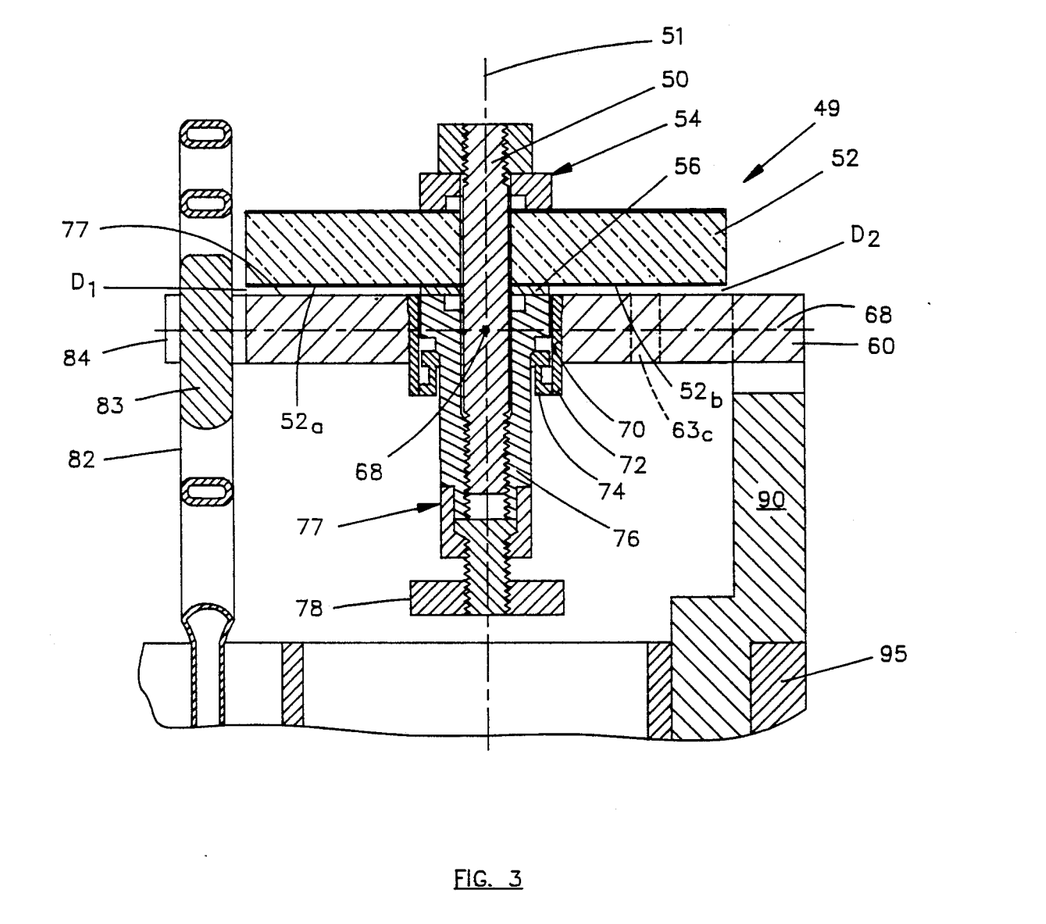
FIG. 3 is a view in longitudinal cross section through a vertical central axis of one form of the present invention.
Figure 4:
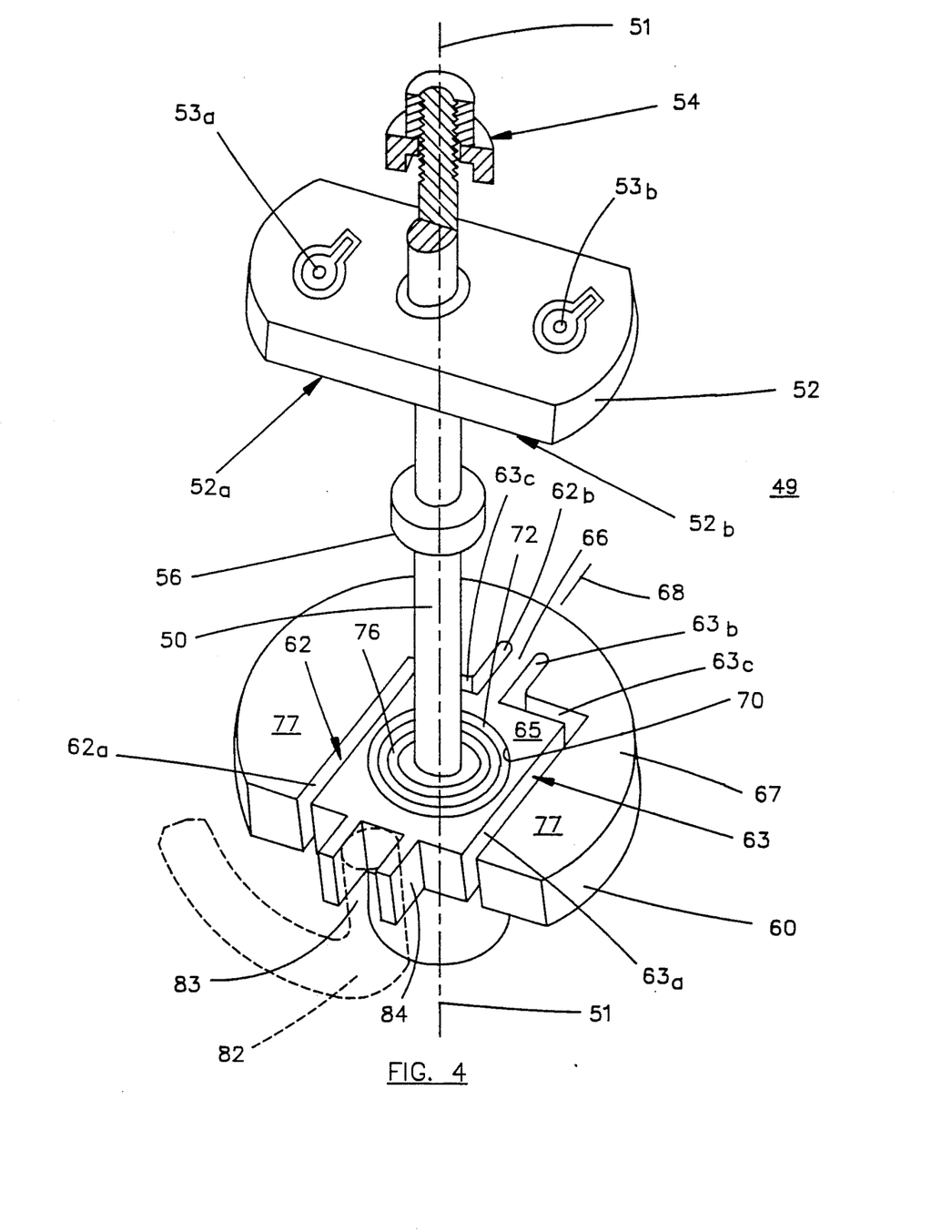
FIG. 4 is an exploded perspective view of the device shown in FIG 3.
Figure 5:
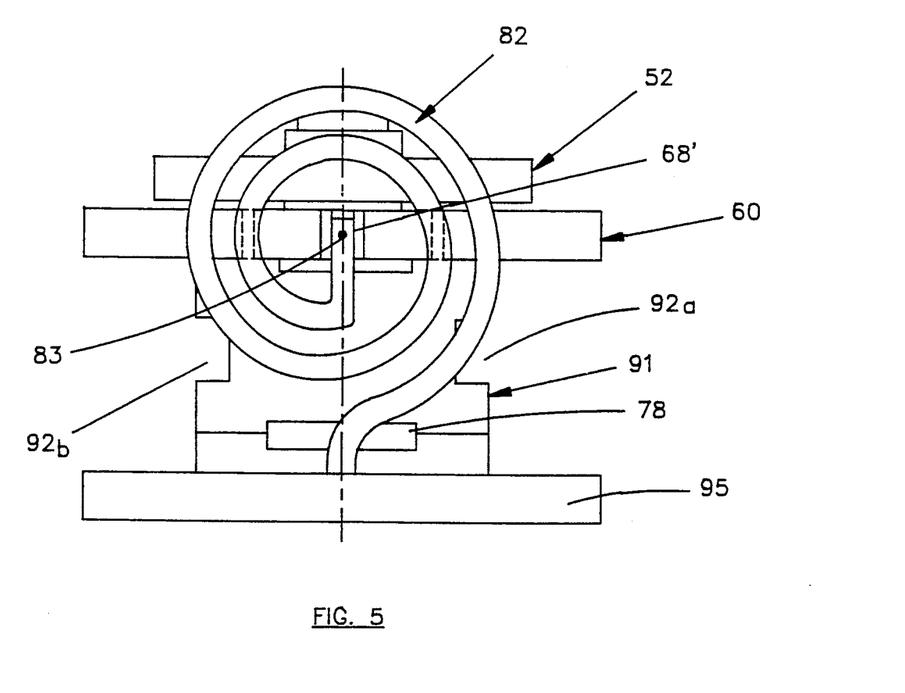
FIG. 5 is a perspective view of a support mounting for illustrating heat paths.

Referring now to FIGS. 3 and 4, a more detailed illustration is provided for the capacitor arrangement of the present invention. In the illustration in the drawings, the structure of a capacitance transducer 49, as illustrated, includes an elongated, cylindrically shaped central fastener rod 50 with a central longitudinal axis 51 which is shown vertically in FIG. 3. The rod 50 is used to couple an upper capacitor plate base member 52 to a torsion beam in a lower capacitor plate base member 60. The upper base member 52 is rectangularly shaped with circular ends and is made of a material having inherently dimensionally stable characteristics under changing environmental conditions such as temperature and time aging. Quartz is a suitable material.

As shown in FIG. 4, the lower capacitor base member 60 is a cylindrically shaped metal plate member which has a vertical slot configuration of slot systems 62,63 which are defined by vertical walls and which are tortuously located in the body of the lower base member 60. The vertical slot configuration provides a central support section 65 which is connected by a torsion beam member 66 to an outer base member section 67. The beam member 66 is rectangular shaped in cross section with a narrow dimension in a horizontal plane and a long dimension in a vertical plane. The beam member 67 is adapted to be torqued about a central horizontal torque or displacement axis 68 where the torque or displacement axis 68 is located centrally of the beam member 66 and on a horizontal median plane extending through the lower base member 60. The displacement axis 68 also intersects and defines a vertical plane with the axis 50.

The central support section 65 thus is a generally rectangularly shaped member defined between the slots 62 and 63 which are symmetrically arranged with respect to the horizontal displacement axis 68.

As shown in FIG. 4, the slot 62 has parallel, vertically walled portions 62a,63a connected to parallel arranged vertically walled end portions 62b and 63b by transversely arranged vertical walled portions 62c and 63c. The spacing between the end portions 62b,63b of the slots 62 and 63 define the narrow width dimension of the beam member 66. The length of the slot portions 62b,63b defines the length of the beam member 66.

In the center of the central section 65 and the base member 60 is a mounting bore 70 which is centered on the central axis 51 (see FIG. 3). The bore 70 receives an annular outer tubular support ring 72. The outer support ring 72 is welded about its periphery at its top surface to the central section 65. Disposed within the outer support ring 72 (see FIG. 3) is an annular temperature compensation spacer 74 which is attached thereto by welding about its periphery at a lower surface junction. The temperature compensation spacer 74 can be of the type disclosed in U.S. Pat. No. 4,322,775. However, the compensation spacer 74 may not be necessary for all applications.

The temperature compensation spacer 74, in turn, has a bore which receives an inner tubular support member 76. The upwardly facing planar surface 77 of the outer base member section 167 of the lower base member 60 are on the same horizontal plane as the upper surface of the center section 65. The downwardly facing surface 52a of the upper base member 52 is parallel to the upper surface 77 of the lower base member 60. Between the inner support member 76 attached to the lower base member 52 and the upper base member 52 is a disc shaped spacer member 56.

The upper base member 52 has a centrally located opening for receiving the fastener rod 50. An upper clamping means 54 and a lower clamping means 76 threadedly attach to the rod 50 so that the upper and lower base members 52 and 60 are assembled in a unitary assembly. The spacer member 56, the rod 50, the clamping means 54 and 76, and the tubular member 72 can be made from a material which is selected to have similar temperature expansion characteristics to the selected material for the base member 52. A metal material such as Invar is suitable. The base member 60 is made from a high strength material, such as a maraging stainless steel with good elastic characteristics for the torsion beam members. The steel member also will provide an electrical ground for the capacitor electrical system.

Figure 6:
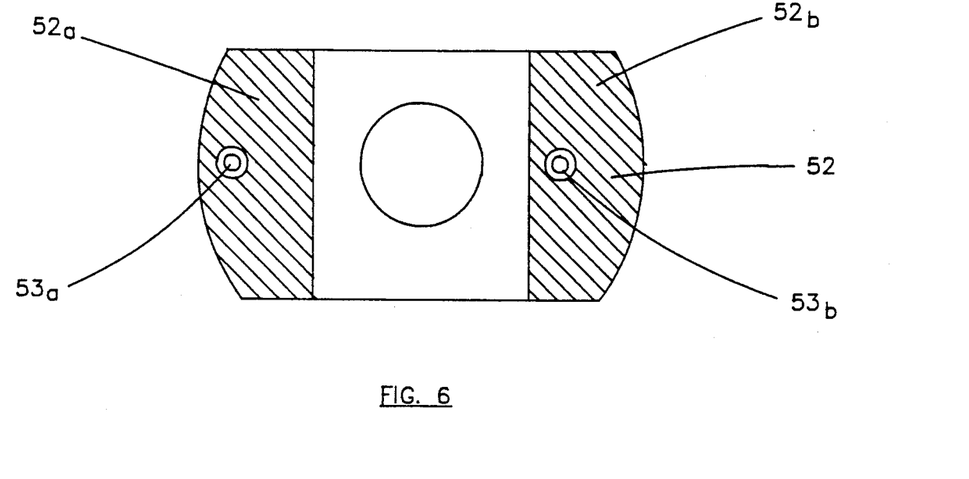
FIG. 6 is a plan view of the bottom surface of the upper capacitor base member of the invention.

The upper capacitor base member 52, as noted before, is a rectangularly shaped member preferably constructed from a quartz material and has first and second capacitance metal films 52a and 52b (see FIG. 6) which are sputtered in separate locations onto the lower surface 52a of the base member 52. The capacitance metal film 52a is arranged in vertical and spacial alignment with a planar surface 77 on the lower capacitance base member 60. Openings 53a, 53b extend from the plate surfaces 52a, 52b so that the plate members can respectively be electrically coupled by a film conductor to the top surface location on the base member 52. Electrical wire conductors are then connectable to each capacitor film plate for use in obtaining separate capacitor measurements.

As shown in FIG. 3, the lower surface on the base member 52 is arranged normally parallel to the planar upper surface 77 on the lower capacitor base member 60 and is normally separated therefrom by a capacitor spacing distance or gap $D_1$. The capacitance plate films 52a and 52b which are offset from the central vertical axis 51 (see FIG. 6) are similarly spaced parallel to the planar surface 77 on the lower base member 60. The widths of the capacitor gap between the respective plate films 52a, 52b and the surface 77 is basically defined by the width of the spacer member 56. It can thus be appreciated that the upper and lower clamping means 54, 76 on the fastener rod 50 attach the upper capacitor base member 52 to the inner support ring 76 and, in turn, to the central section 65 of the lower capacitor base member 60. The torque or displacement axis 68 intersects a median horizontal plane of the lower capacitor base member 60 and upon the application of torque about the torque axis 68, the clamped assembly will be angularly torqued about the torque axis 68 thus changing the capacitance spacings or gaps between the capacitor film plates. As the respective capacitance spacings or gaps are decreased or increased, the related capacitance is increased or decreased.

The torquing of the beam member 66 and the central section 65 of the lower base member 60 is accomplished by a spirally wound bourdon tube 82 (FIG. 3). The bourdon tube 82 has a closed stub end 83 (FIG. 4) which is vertical and parallel to the central axis 51 and is attached by a clevis 84 to the central section 65. The spirally wound bourdon tube 83 is located in a vertical plane offset from the vertical axis 51. When the bourdon tube is subjected to internal pressure it will produce a torque force on the beam member 66 about the displacement axis 68.

At the lower end of the inner support member 76 is an attached counter balance member 77 which has a nut member 78 which is located on a threaded member. The member 78 is used to provide a gravity counterbalance for the mass above the displacement axis 68.

Figure 7:
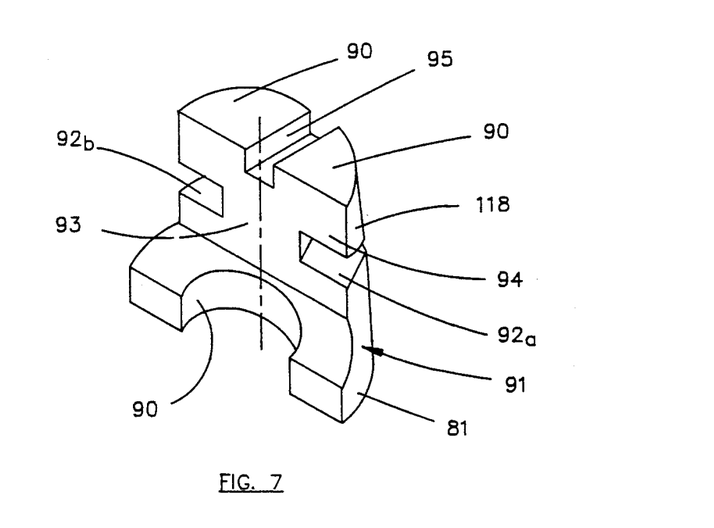
FIG. 7 is a side view to illustrate the bourdon tube.

The lower base member 60 is attached to semi-circular vertical wall segments 90a, 90b of a support member 91. (See FIG. 7). The wall segments 90a, 90b define a transverse slot 95 which has a width greater than the width of the beam 66. The vertical wall segments 90, 90a extend downwardly to semicylindrical base part 99 of the lower base member 91. The wall segments 90a, 90b have transverse slots 92a, 92b to define a narrow center section 93. Thus temperature effects are conducted to the unit through a tortious path. The support member 90 is, in turn, mounted in a support base 95. (See FIG. 30).

Figure 8:
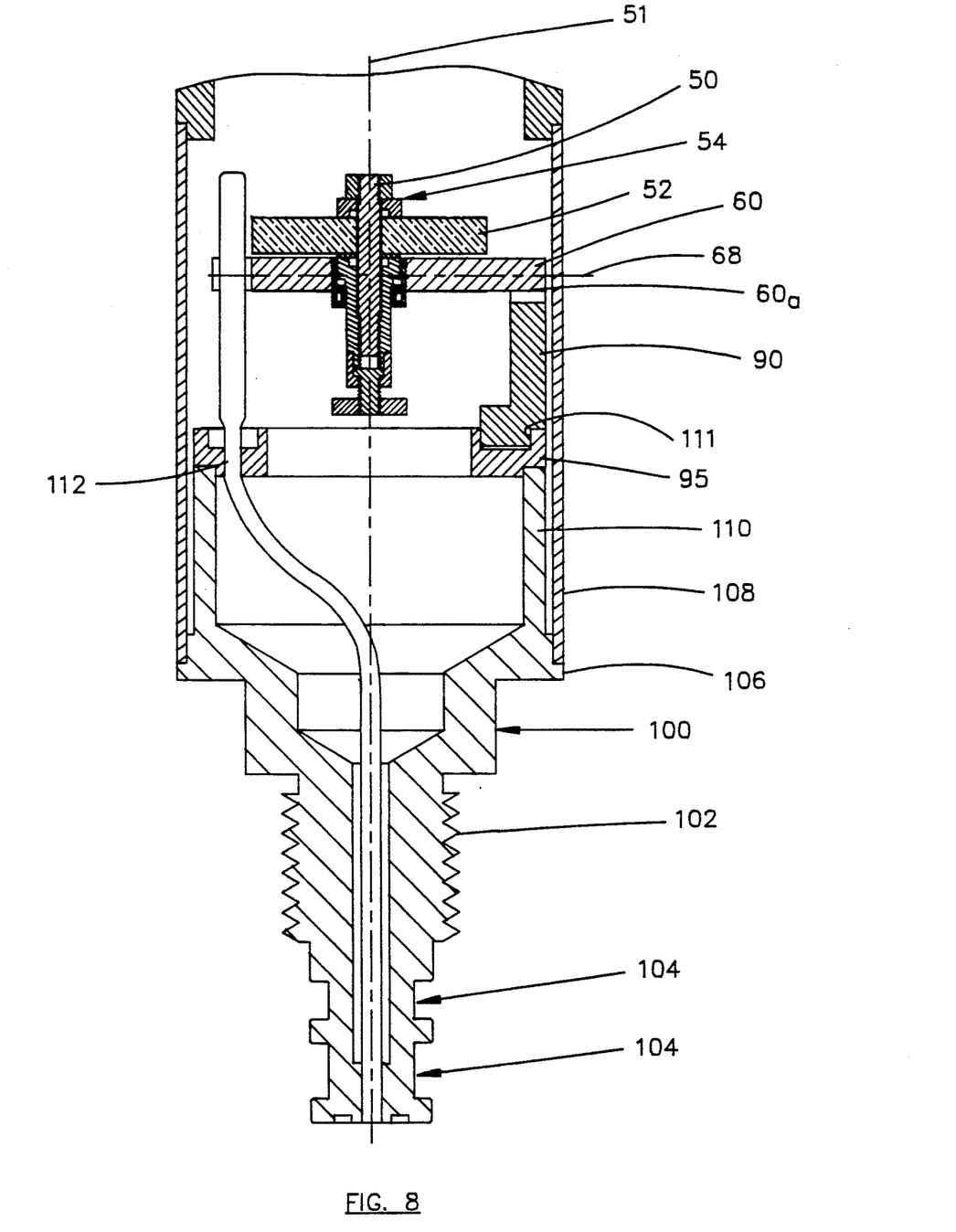
FIG. 8 is a view in a longitudinal cross section of the device in an assembled condition.

Referring now to FIG. 8, a capacitance transducer embodying the present invention is shown in a typical mounting for a pressure sensing system. The support or base member can assume many configurations but in FIG. 8 is shown as a tubular member 100 having a lower external threaded portion 102 for threaded coupling in a tool or pressure probe to receive a pressure medium for a pressure measurement. Grooves 104 for O-ring and pressure seals are provided. The member 100 has a flange 106 which receives a tubular metal enclosure housing 108. In practice, the interior of the enclosure housing 108 is at a vacuum or contains inert gas for the capacitor. The member 106 has an upper internal tubular end 110 which receives the support base 95. The support base 95 has an annular recess 111 which receives the semi-circular end of the support member 91. The bourdon tube also passed through an opening 112 in the support base 95 and is attached by welding to the support base 95. The support base 95 is attached by welding to the end 110 at a location where the displacement axis 68 through the torsion beam 66 and the axis 51 are in a vertical plane perpendicular to a vertical plane extending through the spiral bourdon tube.

One of the features of the present invention is the arrangement which enables use of micro-elastic characteristics of metals. By way of definition, the macro yield point of a metal can be defined as the point where the metal has a set or plastic strain (permanent deformation) of 0.2% or two parts per thousand. The micro yield point of a metal is defined as the point where the metal has a set in a range of 0.01% to 0.0001% or one part per ten thousand to one part per million. In utilizing micro-elastic characteristics a low or small force produces a small deflection. As an example, a 0.2 to 0.5 inch pounds of torque force is used to produce a capacitance deflection of 500 micro-inches. This arrangement for high pressure 10,000–15,000 psi, utilizes a bourdon tube coupled to a capacitor transducer. The capacitor transducer utilizes a relatively small deflection so that the primary determining element is the torque beams which have very low stress levels. The bourdon tube then operates in an essentially constrained mode as a pressure to force converter. Additionally since the stress levels in the torsion beam members are in the micro-elastic range, the elastic characteristics of the torsion beams can approach nearly ideal performance. Ideal performance is approached by the diminishing effect of hysteresis creep, and non-linear response as stress levels are reduced.

The stress levels in obtaining micro-elastic characteristics are low because the deflection required for the capacitor sensor can be small, for example 500 micro-inches. The beam member providing the displacement axis is stiff or rigid and the torque force applied is low, for example 0.2 inch pounds.

By way of example, the diameter of the base member 52 is about 0.850 inches. The diameter of the base member 60 is about 0.900 inches and 0.125 inches thick. The width of the slots is about 0.020 inches. The spacer 56 is 0.001 inches thick.

While the preferred embodiment is to exploit micro yield characteristics to produce accuracy and repeatability, macro yield materials may be suitable for some applications.

A bourdon tube as contrasted to a circular tube has a flattened or ovular cross section as compared to a circular cross section. In high pressure applications a flat oval cross section is commonly employed. In a flattened cross section, internal pressure produces higher stress in the wall because the member tends to move toward a circular cross sectional form. When a tube member with a flattened cross section is spirally wound, internal pressure tends to uncurl the spiral. The flatness of the tube, the coil diameter and the wall thickness also have a bearing on the stress.

In the present invention, the spiral end of a spirally wound bourdon tube is connected to a metal base member which is constructed to enable torsional deflection of a beam member as a function of the applied pressure in the bourdon tube. Bourdon tube design is well known, and the design should minimize the stress in the bourdon tube to develop a low force for the beam members. With the use of torsional deflection in the base member, a capacitance base member located at a distance from the center of deflection is displaced to change capacitance values. There is zero force on the capacitance plates. In short, the capacitance members are moved relative to one another by angular deflection of the capacitor base members. Because the force moment of the bourdon tube is small, the stress level in the torque beam can be kept low. The use of high performance metal alloys can then provide near perfect elastic and stability characteristics of the torsion beam.

By way of example a bellows with a 0.250 inch O.D., 0.150 inch I.D. and an effective area of 0.028 square inches will produce a force of 280 pounds at 10,000 psi and zero deflection. By way of contrast a bourdon tube with a coil O.D. of 0.450 inches, a flat dimension of 0.08 inches, a circular O.D. of 0.092 inches and a wall thickness of 0.017 inches develops about 0.5 inch pounds of torque at 10,000 psi. Thus for high pressure a bourdon tube can be used to develop low forces at high pressures. High pressures can be defined as 500 psi upward.

The two capacitance plates are respectively mounted by aligned connections to a base member which, in turn, is attached to another mass. Since the structure is mounted in a vacuum, temperature change of the capacitance plates is affected primarily by thermal conduction through the mountings. The central mounting on the rear mass serves to conduct heat into the mass essentially equally to both sides. Additionally the mass serves to diffuse any temperature gradients so that heat arrives equally to the supporting points of a plate. Thus, temperature changes tend to closely track between the two capacitor plates and minimize any effect of temperature changes.

A precision sensor should also be insensitive to its orientation with respect to gravity. Balancing of the sensor of this invention is accomplished by adjusting the various weight factors in a well known manner. Because of the relative stiffness of the structure in the vertical direction, balancing is a straight forward application.

The electronics used for this sensor is the same as described in U.S. Pat. No. 4,091,693. A ratio metric measurement is made using the relationship $(C_1 - C_2)/(C_1 + C_2)$ so that the oscillator factor cancels out of the reading. One of the important features of the present invention is that the capacitor can operate with minute deflection changes and produce measurable signals.

It will be apparent to those skilled in the art that various changes may be made in the invention without departing from the spirit and scope thereof and therefore the invention is not limited by that which is enclosed in the drawings and specifications but only as indicated in the appended claims.

What is claimed is:

1. A dual capacitor device for utilizing dependent capacitances for measurement purposes comprising:

an upper capacitor base member and a fixed lower capacitance base member arranged with parallel capacitor surfaces in horizontal planes where said parallel capacitor surfaces are located on opposite sides relative to a vertical central axis and said capacitance surfaces define first and second capacitors;

said lower capacitor base member having a centrally located section connected to an outer section of said lower capacitor base member by a torsion beam member, said centrally located section being attached to said upper capacitor base member by a vertical arm member;

said torsion beam member having a displacement axis normal to said central axis so that angular displacement of said torsion beam member and said centrally located section about said displacement axis produces a capacitance change in said first and second capacitors; and force means coupled to said centrally located section in a diametrically located position to said torsion beam member for producing a torsion moment force on said torsion beam member for developing angular displacement of said centrally located section and a capacitance change as a function of said torsion moment force.

2. The capacitor device as set forth in claim 1 wherein said lower capacitor base member has a first vertically walled slot means which define said centrally located section and which define said torsion beam member where said torsion beam member connects to said outer section of said lower capacitor base member and said force means is connected to said centrally located section.

3. The capacitor device as set forth in claim 2 wherein the torsion beam member is constructed from a high strength metal material having good elastic characteristics and wherein the force means is a bourdon tube arranged for developing a torsion force which does not exceed the micro yield point of the torsion beam member.

4. The capacitor device as set forth in claim 1 wherein the torsion beam member is constructed from a high strength metal material having good elastic characteristics and wherein the force means is a bourdon tube arranged for developing a torsion force which does not exceed the micro yield point of the torsion beam member.

5. The capacitor device as set forth in claim 4 wherein said force means includes a clevis member extending along said displacement axis, said bourdon tube having a closed end and an open end which are aligned along a common axis and with the central portion of the bourdon tube arranged in a spiral about a bourdon tube coil axis which is aligned with said displacement axis, and said closed end being coupled to said centrally located section so that the bourdon tube develops a moment force about said displacement axis.

6. The capacitor device as set forth in claim 1 wherein the torsion beam means are constructed from a high strength metal material having good elastic characteristics and wherein the force means includes a bourdon tube arranged for developing a torsion force which does not exceed the macro yield point of the torsion beam means.

7. The capacitor device as set forth in claim 6 wherein said bourdon tube has a closed end and an open end which are aligned along a common axis and where the central portion of the bourdon tube is arranged in a spiral about a bourdon tube coil axis which is aligned with said displacement axis, said closed end being coupled to said centrally located section so that the bourdon tube develops a moment force about said displacement axis.

8. The capacitor device as set forth in claim 7 and further including support means attached to said outer section of said lower base member, said support means having arcuate wall segments diametrically arranged and attached to said outer base member on either side of said torsion beam.

9. The capacitor device as set forth in claim 1 wherein the torsion beam member is constructed from a high strength metal material having good elastic characteristics with a macro yield point above the working stress levels in said torsion beam member.

10. The capacitor device as set forth in claim 1 wherein the torsion beam member are constructed from a material having good elastic characteristics with a micro yield point above the working stress levels of the torsion beam member.

11. The capacitor device as set forth in claim 1 wherein the torsion beam member is constructed from a high strength metal material having good elastic characteristics in the stress range of the torsion beam member.

12. The capacitor device as set forth in claim 1 wherein the force means is a bourdon tube arranged for developing a torsion force which does not exceed the micro yield point of the torsion beam member.

* * * * *